US011215282B2

(12) United States Patent
Klein

(10) Patent No.: US 11,215,282 B2
(45) Date of Patent: Jan. 4, 2022

(54) PARK LOCK FOR AN AUTOMATIC TRANSMISSION IN A MOTOR VEHICLE

(71) Applicant: ZF Friedrichshafen AG, Friedrichshafen (DE)

(72) Inventor: Julia Klein, Friedrichshafen (DE)

(73) Assignee: ZF FRIEDRICHSHAFEN AG, Friedrichishafen (DE)

( * ) Notice: Subject to any disclaimer, the term of this patent is extended or adjusted under 35 U.S.C. 154(b) by 0 days.

(21) Appl. No.: 16/757,121

(22) PCT Filed: Sep. 6, 2018

(86) PCT No.: PCT/EP2018/073951
§ 371 (c)(1),
(2) Date: Apr. 17, 2020

(87) PCT Pub. No.: WO2019/076531
PCT Pub. Date: Apr. 25, 2019

(65) Prior Publication Data
US 2020/0248806 A1 Aug. 6, 2020

(30) Foreign Application Priority Data

Oct. 19, 2017 (DE) ...................... 10 2017 218 748.4

(51) Int. Cl.
*F16H 63/34* (2006.01)
(52) U.S. Cl.
CPC ................. *F16H 63/3491* (2013.01)
(58) Field of Classification Search
CPC ............. F16H 63/3491; F16H 63/3483; F16H 63/3433; F16H 63/3475; F16H 63/38
See application file for complete search history.

(56) References Cited

U.S. PATENT DOCUMENTS 6,481,556 B1   11/2002   Haupt
8,844,703 B2*  9/2014   Jang ...................... B60T 17/221
                                                                192/219.6
(Continued)

FOREIGN PATENT DOCUMENTS

DE    19837832 A1    2/2000
DE    10245386 A1    4/2004
(Continued)

OTHER PUBLICATIONS

German Patent Application No. DE 102017210069.9, dated May 29, 2017 (39 pages).
(Continued)

*Primary Examiner* — Mark A Manley
(74) *Attorney, Agent, or Firm* — Dority & Manning, P.A.

(57) ABSTRACT

A parking lock includes a locking pawl (2) and an interlocking element (6) arranged on a connecting bar (5) to a selector lever (4). During engagement of the parking lock, the selector lever (4) is rotated by a spring (9). A hydraulically actuatable actuator (10) including two pistons (11, 12). A first piston (11) is pressurized in order to disengage the parking lock and axially displace the second piston (12) against a spring (9). Axial movement of the second piston (12) rotates the selector lever (4) and vice versa. A detent device (13) of the actuator (10), is actuatable by an electromagnet (13a). An emergency release device (15) is operatively connectable with the selector lever (4) so that the second piston (12) is axially displaceable by the selector lever (4) without displacing the first piston (11).

15 Claims, 9 Drawing Sheets

(56) References Cited

U.S. PATENT DOCUMENTS

| | | | |
|---|---|---|---|
| 9,193,336 B2 * | 11/2015 | Frait | B60T 13/588 |
| 9,383,012 B2 | 7/2016 | Popp et al. | |
| 2002/0084149 A1 | 7/2002 | Heuver | |
| 2011/0030494 A1 | 2/2011 | Ruhl | |
| 2016/0082933 A1 | 3/2016 | Iwata et al. | |

FOREIGN PATENT DOCUMENTS

| | | |
|---|---|---|
| DE | 102006012343 A1 | 9/2007 |
| DE | 102009028340 A1 | 2/2011 |
| DE | 102012210571 A1 | 12/2013 |
| DE | 112014002064 T5 | 12/2015 |

OTHER PUBLICATIONS

International Search Report (English Translation) PCT/EP2018/073951, dated Oct. 22, 2018. (2 pages).
German Search Report DE102017218748.4, dated Jun. 21, 2018. (12 pages).

* cited by examiner

PARK LOCK FOR AN AUTOMATIC TRANSMISSION IN A MOTOR VEHICLE

CROSS-REFERENCE TO RELATED APPLICATION

The present application is related and has right of priority to German Patent Application No. 10 2017 218 748.4 filed on Oct. 19, 2017 and to PCT International Publication No. WO2019/076531, both of which are incorporated by reference in their entirety for all purposes.

FIELD OF THE INVENTION

The present invention relates to a parking lock for an automatic transmission in a motor vehicle.

BACKGROUND

A parking lock of an automatic transmission is a device which can secure the motor vehicle, in which the automatic transmission is installed, against rolling away. Various designs of these types of parking lock mechanisms are known from the prior art. These parking lock mechanisms usually include a locking pawl, which is pivotably mounted on a pawl pin and engages into or disengages from a parking interlock gear connected to the output shaft of the transmission, and an interlocking element arranged on a connecting bar to a selector disk mounted on a pin. In the interlocked condition, the interlocking element is clamped between the locking pawl and a guiding plate in order to prevent the locking pawl from being forced out of a tooth space of the parking interlock gear. In this case, the interlocking element is spring-mounted on the connecting bar via a spring element. The engagement of the parking lock usually takes place mechanically via the spring force of a spring.

In modern automatic transmissions, a hydraulic system is frequently provided for disengaging the parking lock, in the case of which the end of the connecting bar facing away from the interlocking element is articulatedly connected to the selector disk, which is operatively connected to a piston rod of a hydraulically actuatable parking lock piston, which is arranged in a parking lock cylinder and is axially displaceable against the force of the spring, which is usually designed as a leg spring, for disengaging the parking lock, and is axially displaceable by the force of the spring for engaging the parking lock.

In order to disengage such a parking lock, the cylinder chamber of the parking lock cylinder is pressurized and pushes the parking lock piston and, therefore, the selector disk against the spring force of the leg spring into the "P_aus" (parking lock disengaged) position. In order to additionally lock the parking lock piston of the parking lock cylinder in this position, a solenoid valve is usually provided, which is electrically energized in this position of the parking lock cylinder and, as a result, actuates a detent mechanism acting on the parking lock piston.

In order to engage such a parking lock, the solenoid valve is de-energized again, the cylinder chamber of the parking lock cylinder is vented, and the mechanical interlock of the parking lock piston is released. Due to the preloaded leg spring on the selector disk, the selector disk and, therefore, the parking lock piston are brought into the "P_ein" (parking lock engaged) position. In the process, the interlocking element, which is generally designed as a locking cone, is displaced on the guiding plate under the locking pawl and then acts on the locking pawl in such a way that a tooth of this locking pawl can engage into a corresponding tooth space of the locking toothing of the parking interlock gear. In a tooth-on-tooth position, the spring element, with the aid of which the interlocking element is spring-mounted on the connecting bar, is preloaded, and so, as soon as a tooth of the locking pawl hits a tooth space, the locking pawl engages into the locking toothing of the parking interlock gear.

A hydraulically disengageable parking lock usually also includes an emergency release in order to enable the locking pawl to be mechanically disengaged from the locking position in the event of a failure of the hydraulic pressure supply of the automatic transmission.

This type of parking lock system including a mechanical emergency release is known, for example, from DE 198 37 832 A1, which belongs to the applicant. In this case, the locking pawl of the parking lock is mechanically actuated, during normal operation, in the usual way via a detent disk which is rotated by the spring force of a spring in order to mechanically engage the parking lock and is rotated by the compressive force of a hydraulic cylinder in order to hydraulically disengage the parking lock. As an emergency release, a cam disk is additionally provided, which is arranged in parallel to the detent disk and is operatively connected via a driving part to the detent disk in such a way that the detent disk is turnable by the cam disk, during emergency operation, in order to disengage the parking lock, without the detent disk turning the cam disk during normal operation.

Usually, the pressure medium supply to the hydraulic cylinder of such a parking lock system, as well as the venting of this hydraulic cylinder, take place via a control valve or several hydraulically interacting control valves of the electro-hydraulic transmission control unit, which is supplied with pressure medium by an oil pump, which is driven by an engine provided for driving the transmission. In order to protect against an unintentional disengagement of the parking lock due to a malposition, which is present upon the start of the engine, of one or several of these control valves acting on the hydraulic cylinder of the parking lock system. DE 10 2012 210 571 A1, which belongs to the applicant, provides that the piston rod of the hydraulic cylinder is equipped with two electromagnetically actuatable locking mechanisms, which are actuated by the same electromagnet. In this case, the first locking mechanism mechanically interlocks the piston rod in the position that is associated with the disengaged condition of the parking lock and is present when the hydraulic cylinder is non-pressurized. The second locking mechanism, on the other hand, mechanically interlocks the piston rod in the position that is associated with the engaged condition of the parking lock and, therefore, protects the parking lock system against an unintentional, i.e., fault-induced, disengagement of the previously properly engaged parking lock. A person skilled in the art refers to this type of parking lock actuating system as a "hydraulically actuatable parking lock actuator having bi-stable piston interlock". In the event of a failure of the electrohydraulic transmission control unit, it is no longer possible, however, to once again release the, generally, form-fit mechanical detent via the electromagnet, since the electrical control is disabled. An emergency release mechanically acting on the piston rod for manually disengaging the parking lock is therefore disabled in this parking lock system.

Patent application DE 102017210069.9, which was not previously published and which belongs to the applicant, describes a highly compact parking lock unit, in which the connecting bar, together with the interlocking element of the parking lock, is arranged in parallel to the locking pawl and perpendicularly to a pawl pin inserted in the transmission housing. The locking pawl of the parking lock and the selector lever of the parking lock are pivotably mounted on the pawl pin. In this case, the end of the connecting bar positioned opposite the interlocking element is articulatedly connected to the selector disk.

In order to disengage this parking lock, a pressurizable hydraulic piston is provided, the piston rod of which is also articulatedly connected to the selector disk, so that each axial movement of the hydraulic piston brings about an axial movement of the connecting bar. In this case, the piston rod is electromagnetically lockable both in a first end position, which is associated with the "parking lock engaged" condition, and in a second end position, which is associated with the "parking lock disengaged" condition.

In order to engage this parking lock, a spring is provided, which is tensioned between the transmission housing and the selector disk in such a way that the spring force of the spring acts counter to the piston force of the hydraulic piston and, for the case in which the hydraulic piston is not pressurized, turns the selector disk into a position that is associated with the "parking lock engaged" condition. This spring can be designed as a leg spring, the coils of which concentrically enclose the pawl pin. Alternatively, this spring can be designed as a compression spring, which concentrically encloses the piston rod of the hydraulic piston. Moreover, a hold-down spring is hung on the selector disk and is preloaded in such a way that its spring force holds the locking pawl in the disengaged condition for the case in which the parking lock is disengaged.

SUMMARY OF THE INVENTION

Example aspects of the present invention further develop the parking lock for an automatic transmission described in patent application DE 102017210069.9, which was not previously published, in such a way that an emergency release of the parking lock is possible without the need to dispense with the compact design and the other advantages of DE 102017210069.9.

Accordingly, example aspects of the invention are directed to a parking lock for an automatic transmission in a motor vehicle, which includes a parking interlock gear. The parking interlock gear includes a locking toothing with tooth spaces and is connected to a transmission shaft in a torsion-proof manner. A locking pawl, which is pivotably mounted on a pawl pin and includes a ratchet tooth, which, in the engaged condition of the parking lock, engages into a tooth space of the locking toothing of the parking interlock gear. In this way, the locking pawl blocks the parking interlock gear and the transmission shaft against rotation. A selector lever is displaceable about a selector-lever axis of rotation in order to specify the engagement position of the parking lock. A connecting bar is articulatedly connected to the selector lever and includes an interlocking element, which is spring-mounted counter to the parking lock disengagement direction. During the engagement of the parking lock, the connecting bar brings about the engagement of the ratchet tooth of the locking pawl into a tooth space of the locking toothing of the parking interlock gear. In the engaged condition of the parking lock, the connecting bar prevents the ratchet tooth of the locking pawl from getting pushed out of the tooth space of the locking toothing of the parking interlock gear. A spring has a spring force which acts on the selector lever in the parking lock engagement direction. A hydraulically actuatable actuator has a compressive force which acts on the selector lever in the parking lock disengagement direction. In this case, the end of the connecting bar facing away from the interlocking element is articulatedly connected to the selector lever.

In addition, the parking lock according to example aspects of the invention includes an emergency release device, which can be mechanically brought into an operative connection with the selector lever in such a way that the parking lock is manually disengageable.

According to example aspects of the invention, the actuator includes two pistons, which are axially displaceably arranged on the same longitudinal axis in an actuator housing, and an electromagnetically actuatable detent device arranged in the actuator housing. The first piston is hydraulically pressurizeable in order to disengage the parking lock and, upon pressurization, displaces the second piston in the axial direction against the spring force of the spring. The second piston is mechanically connected to the selector lever in such a way that an axial movement of the second piston brings about a rotation of the selector lever about a selector-lever axis of rotation, and vice versa. The detent device is actuatable by an electromagnet in such a way that the detent device mechanically locks the first piston either in a piston position associated with the engaged condition of the parking lock or in a piston position associated with the disengaged condition of the parking lock, when the electromagnet is not energized, and the electromagnet must be energized in order to release the detent in the particular piston position. Such a detent device can also be designated as a "bi-stable detent of the first piston".

This arrangement according to example aspects of the invention makes it possible, in a particularly advantageous way, in the case of an actuation of the emergency release device, for the second piston to be axially displaced by the selector lever without the first piston leaving the locked piston position corresponding to the engaged condition of the parking lock.

Preferably, the first piston and the second piston are arranged one behind the other as viewed in the direction of the longitudinal axis. In this case, it can also be provided that the spring is designed as a compression spring, which is axially mounted between the second piston and the actuator housing and, in the process, entirely or partially concentrically surrounds a piston rod of the second position, as viewed axially.

In addition, in one example embodiment of the invention, the parking lock also includes a transmission housing-affixed guiding device, which is designed as a guiding plate or as a guide sleeve, against which the locking device rests, counter to a normal force of the locking pawl, during the engagement and disengagement of the parking lock. Such a guiding device can be directly attached to the actuator housing, although, alternatively, the guiding device can also be an integral part of the actuator housing.

In another example embodiment of the invention, it is provided that, upon actuation of the emergency release device, an inner lever of the emergency release device, which is arranged within a transmission housing of the automatic transmission, acts mechanically directly on the selector lever. Alternatively, it can be provided that, upon actuation of the emergency release device, an inner lever of the emergency release device, which is arranged within a transmission housing of the automatic transmission, acts mechanically directly on the piston rod of the second piston, so that the inner lever acts on the selector lever via the piston rod.

In one further example embodiment of the invention, it is provided to displaceably mount the selector lever on the pawl pin, so that the selector-lever axis of rotation, the pawl pin longitudinal axis, and the locking pawl pivot axis are identical or coaxial. In this case, the connecting bar, which is articulatedly attached to the selector lever, can be arranged below the locking pawl in such a way that the plane of movement of the connecting bar is arranged essentially in parallel to the plane of movement of the locking pawl, the selector lever, and the piston rod. Due to such an arrangement of the selector lever and the pawl pin, the bearing base of the pawl pin bearing for supporting the pawl pin can be designed having relatively small dimensions. It can also be provided that the selector lever includes two legs, each of which includes a circular bore, wherein these bores are arranged coaxially to each other and are utilized for mounting the selector lever on the pawl pin, wherein the locking pawl is mounted between the two legs. Due to this design, friction effects are minimized in an advantageous way. In the end, an extremely compact and robust design of an assembly for actuating the parking lock results.

In one example refinement of the invention, it is provided to attach or hang a hold-down spring on the selector lever acting on the locking pawl, which, in the disengaged condition of the parking lock, prevents the locking pawl from touching the parking interlock gear. As a result, the above-described arrangement and structural design of the optimized mounting of the locking pawl can be provided with one further functional advantage: in the disengaged condition of the parking lock, a spring force of the hold-down spring, which is now still acting on the locking pawl, reliably prevents the locking pawl from touching the parking interlock gear, whereby a rattling of the locking pawl is reliably prevented.

Preferably, in the process, a force-transmitting section of the hold-down spring—for example, a free end of the hold-down spring—comes into contact with the locking pawl in a force-locking manner only if the selector lever, starting from a position of the selector lever corresponding to the engaged condition of the parking lock, is rotated by a predefined angle in the direction of a position of the selector lever corresponding to the disengaged condition of the parking lock, so that, only for the case in which this force-transmitting section of the hold-down spring acts on the locking pawl in a force-locking manner, the force of the hold-down spring acting on the locking pawl prevents contact between the locking pawl and the parking interlock gear.

Alternatively, the hold-down spring on the selector lever is preloaded, for example, in such a way that a force-transmitting section of the hold-down spring is already in contact with the locking pawl in a force-locking manner when the selector lever is in the position of the selector lever corresponding to the engaged condition of the parking lock, wherein, for the case in which the selector lever, starting from the position of the selector lever corresponding to the engaged condition of the parking lock, is turned in the direction of the position of the selector lever corresponding to the disengaged condition of the parking lock, the force of the hold-down spring acting on the locking pawl is increased in such a way that contact between the locking pawl and the parking interlock gear is reliably prevented.

In a cost-effective way, the hold-down spring can be designed as a bending spring formed from spring wire.

BRIEF DESCRIPTION OF THE DRAWINGS

Example aspects of the invention are explained in greater detail in the following, by way of example, with reference to the attached figures. Wherein.

DETAILED DESCRIPTION

Figure 1:
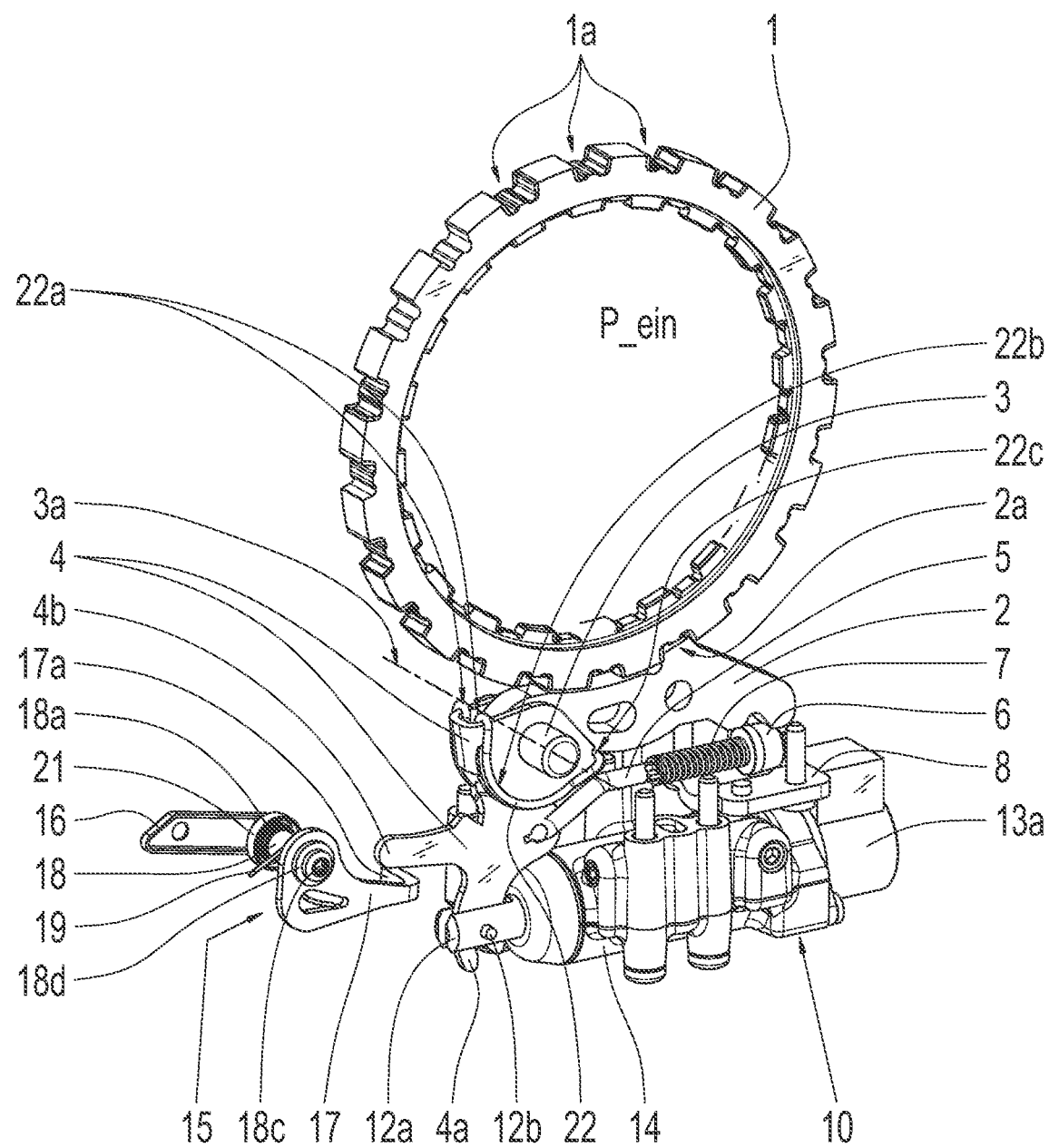
FIG. 1 shows a perspective schematic of a first exemplary embodiment of a parking lock according to example aspects of the invention in the "parking lock engaged" engagement position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
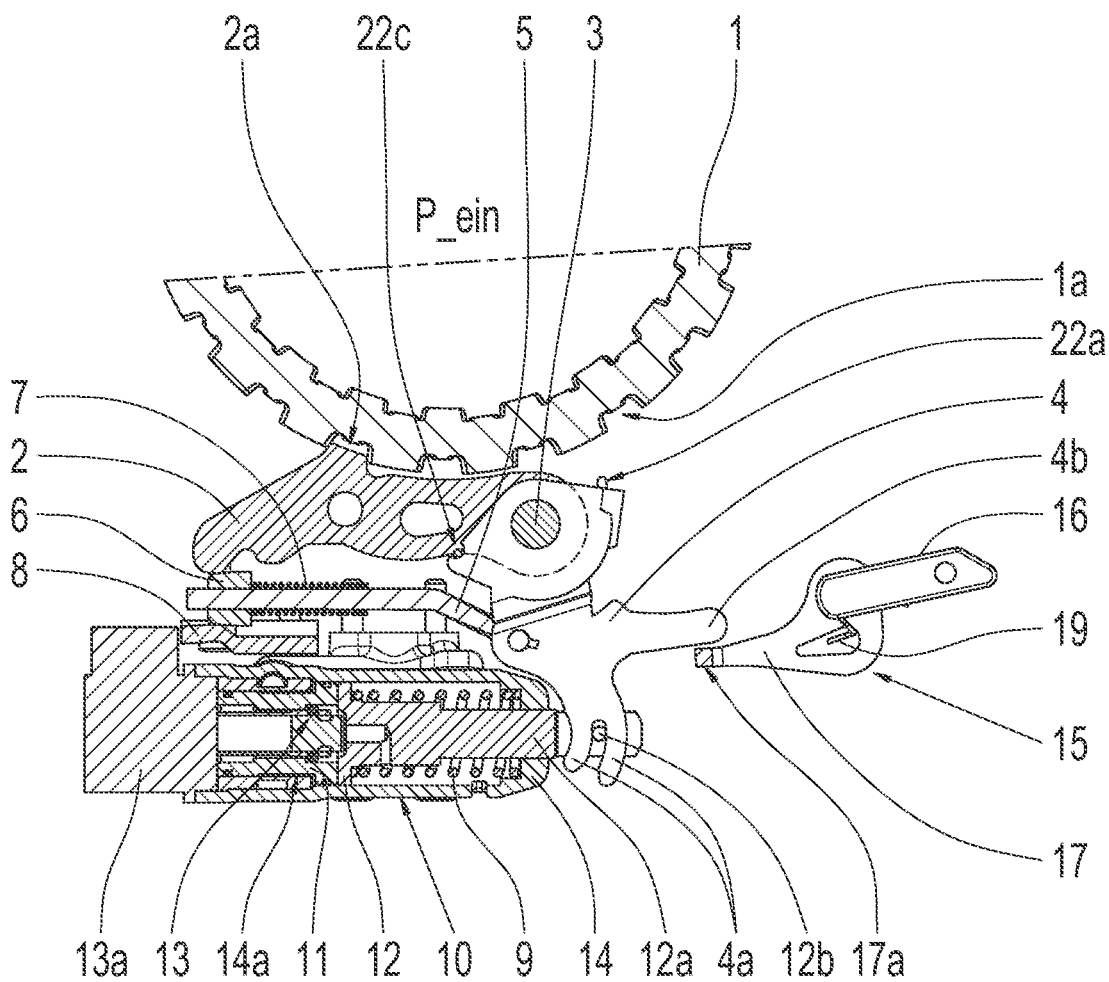
FIG. 2 shows a diagrammatic sectioning of the example parking lock according to FIG. 1 in the "parking lock engaged" engagement position.
Figure 3:
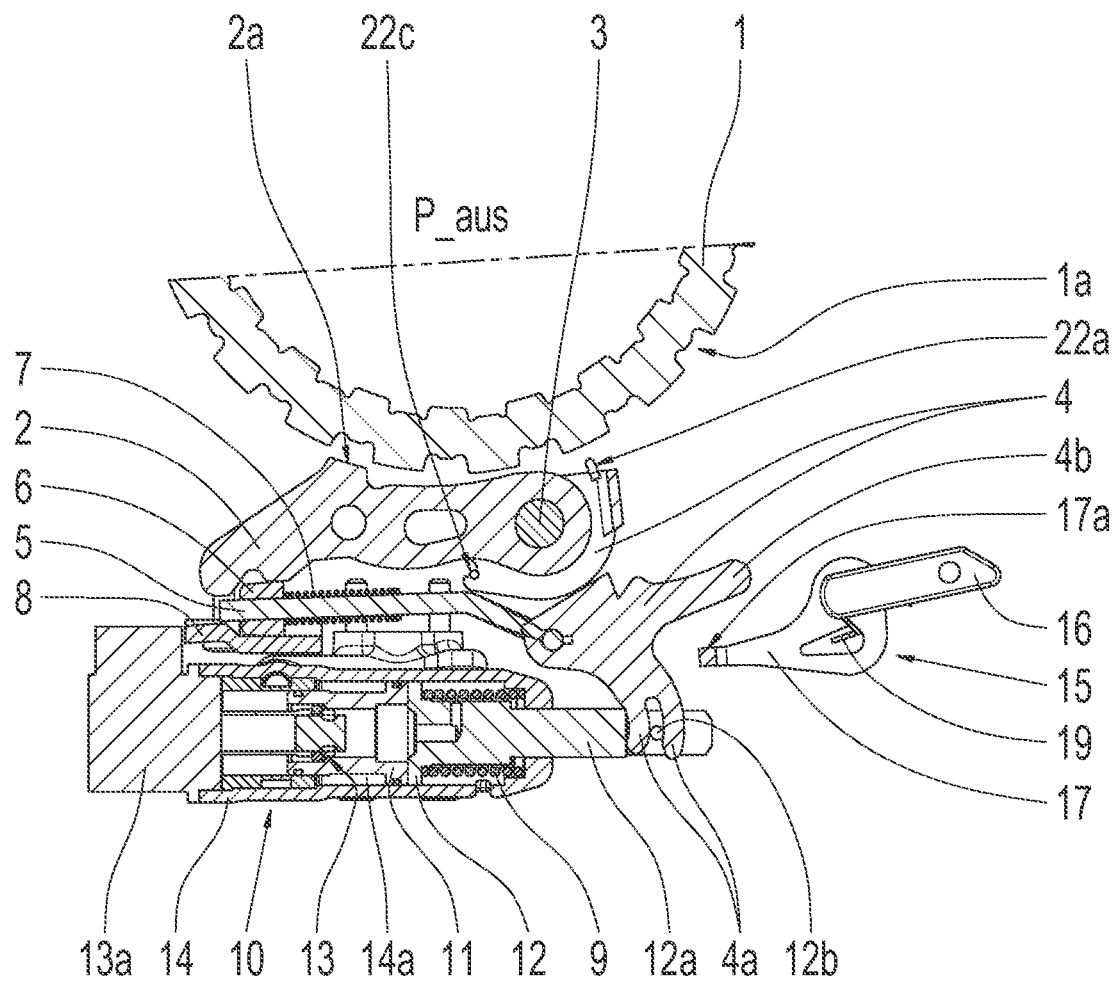
FIG. 3 shows a diagrammatic sectioning of the example parking lock according to FIG. 1 in the "parking lock disengaged" engagement position.
Figure 4:
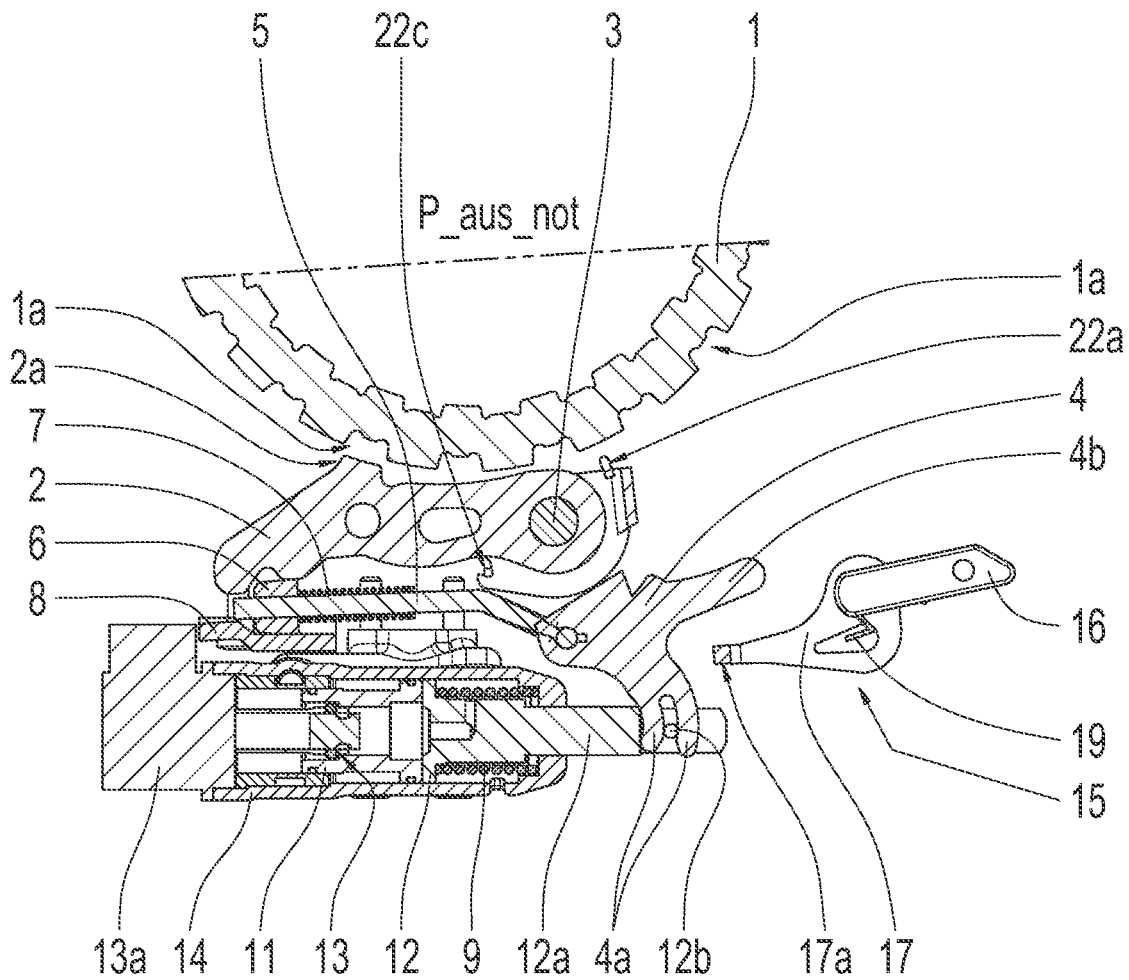
FIG. 4 shows a diagrammatic sectioning of the example parking lock according to FIG. 1 in the "parking lock emergency-released" engagement position.
Figure 5:
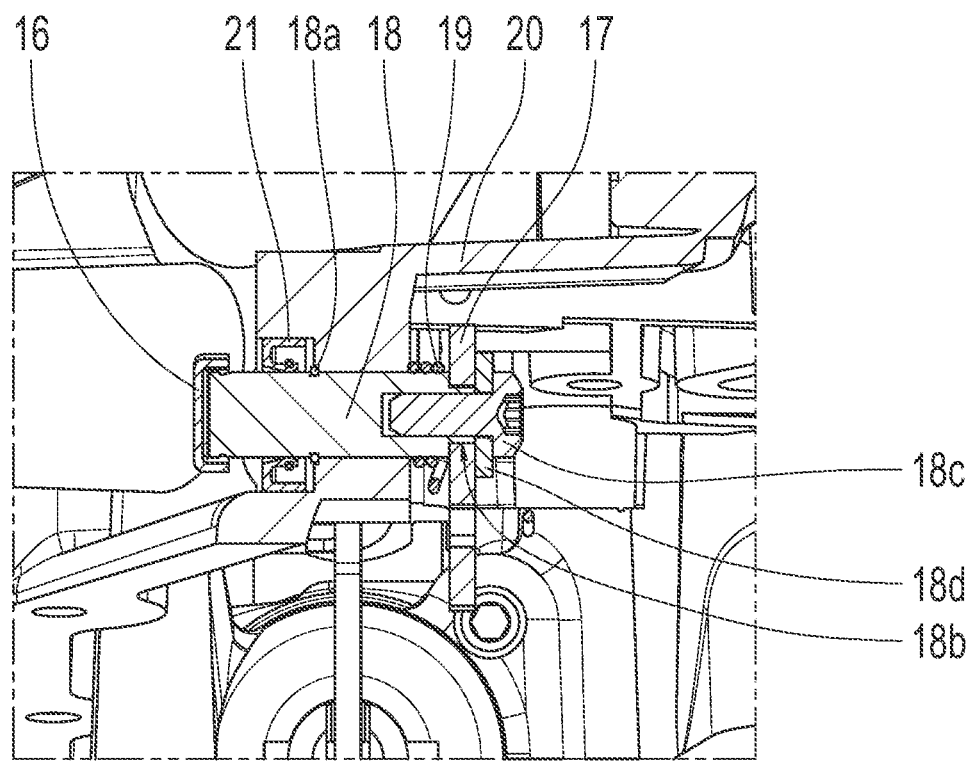
FIG. 5 shows a diagrammatic sectioning of a mounting concept of the emergency release device of the example parking lock according to FIG. 1.

A preferred first exemplary embodiment of a parking lock according to example aspects of the invention for an automatic transmission of a motor vehicle is described in greater detail in the following and with reference to FIGS. 1 through 5. FIG. 1 shows a three-dimensional representation of the parking lock in the "parking lock engaged" engagement position, marked by the reference character P_ein. FIG. 2 shows a corresponding section view of the parking lock. FIG. 3, on the other hand, shows a section view of the parking lock in the "parking lock disengaged" engagement position, marked by the reference character P_aus. FIG. 4 shows a section view of the parking lock in a "parking lock emergency-released" engagement position, in which the parking lock has been disengaged as a result of an actuation of the emergency release device, marked by the reference character P_aus_not. Finally, FIG. 5 shows a section view of an example for a mounting concept of the emergency release device of the parking lock.

The parking lock shown in FIGS. 1 through 4 includes a locking pawl 2, pivotably mounted on a pawl pin 3. A ratchet tooth 2a of the locking pawl 2 engages into or disengages from a tooth space 1a of a parking interlock gear 1 connected to the transmission shaft of the automatic transmission (not represented here in greater detail) depending on the engagement position P_ein, P_aus, respectively, of the parking lock. The parking lock also includes an interlocking element 6, which is arranged on a connecting bar 5 to a selector lever 4 and is spring-mounted via a spring element 7. In the locked condition, i.e., in the "parking lock engaged" engagement condition, the interlocking element 6 is clamped between the locking pawl 2 and a transmission housing-affixed guiding plate 8 in order to prevent the ratchet tooth 2a from being pushed out of the corresponding tooth space 1a of the parking interlock gear 1. The interlocking element 6, which is spring-mounted counter to the parking lock disengagement direction, is designed as a locking cone, by way of example, although the interlocking element 6 can be alternatively designed, for example, as a roller element.

In an installation space-saving manner, the selector lever 4 is displaceably mounted on the pawl pin 3, so that the pawl pin longitudinal axis 3a, the locking pawl pivot axis, and the selector-lever axis of rotation are identical. In the exemplary embodiment represented here, the selector lever 4 includes two legs, each of which includes a circular bore, wherein these bores are arranged coaxially to each other and are utilized for mounting the selector lever 4 on the pawl pin 3, wherein the locking pawl 2 is mounted between the two legs.

The end of the connecting bar 5 facing away from the interlocking element 6 is articulatedly connected to the selector lever 4. In order to be able to engage and disengage the parking lock, the selector lever 4 includes a driving part 4a, which is connected to a hydraulically actuatable actuator 10, with the aid of which the engagement position of the parking lock can be specified.

In the first exemplary embodiment of the invention represented here, it is essential that this actuator 10 includes a first piston 11 and a second piston 12, which are axially displaceably arranged on the same longitudinal axis in a control housing 14 of the actuator 10, wherein only the first piston 11 can be hydraulically pressurized in order to disengage the parking lock. Upon pressurization, the first piston 11 displaces the second piston 12 in the axial direction against the spring force of a spring 9. The spring 9 is designed as a compression spring, is mounted axially between the second piston 12 and the actuator housing 14 and, viewed axially, concentrically surrounds a piston rod 12a of the second piston 12. The second piston 12 is mechanically connected to the selector lever 4 via a pin 12b, which is inserted into the piston rod 12a and engages into the driving part 4a of the selector lever 4, so that an axial movement of the second piston 12 brings about a rotation of the selector lever 4 about the selector-lever axis of rotation 3a. On the other hand, a rotation of the selector lever 4 about the axis of rotation 3a also always brings about an axial movement of the second piston 12.

In the first exemplary embodiment of the invention represented here, it is also essential that the actuator 10 includes a bi-stable detent device 13 for the first piston 11. The bi-stable detent device 13 is arranged within the actuator housing 14—centrally within the first piston 11, by way of example, in this case—and can be electromagnetically actuated by an electromagnet 13a. The electromagnet 13a is arranged on the actuator housing 14, in such a way that the detent device 13 mechanically locks the first piston 11 either in a piston position associated with the engaged condition P_ein of the parking lock or in a piston position associated with the disengaged condition P_aus of the parking lock, when the electromagnet 13a is not energized. The electromagnet 13a must be energized in order to release the detent in the particular piston position of the first piston 11.

In the exemplary embodiment represented here, the connecting bar 5 articulatedly attached to the selector lever 4 is arranged, viewed spatially, below the locking pawl 2 in parallel to the locking pawl 2 and perpendicularly to the pawl pin 3, and so the plane of movement of the connecting bar 5 is arranged essentially in parallel to the plane of movement of the locking pawl 2, the selector lever 4, and the piston rod 12a. This specific arrangement is, advantageously, highly installation-space-saving.

In the exemplary embodiment represented here, the guiding plate 8 is attached to the control housing 14 of the actuator 10, although, alternatively, the guiding plate 8 can also be designed as an integral part of the control housing 14. Instead of the design as a guiding plate 8, the transmission housing-affixed guiding device—against which the locking device 6 rests, counter to a normal force of the locking pawl 2, during engagement and disengagement of the parking lock—can be designed, for example, as a guide sleeve, which is then attached to the control housing 14 or is integrated into the control housing of the actuator 10. The control housing 14 itself can also be, for example, an integral part of an electro-hydraulic transmission control unit of the automatic transmission.

In the exemplary embodiment represented here, the parking lock additionally includes a hold-down spring 22, which is hung on the selector lever 4 and, in the disengaged condition P_aus of the parking lock, prevents the locking pawl 2 from coming into contact with the parking interlock gear 1. The distinguishing feature of the hold-down spring 22 is the mounting of the hold-down spring 22 on the selector lever 4. The hold-down spring 22 is preloaded on the selector lever 4 in such a way that a force-transmitting section of the hold-down spring 22 comes into contact with the locking pawl 2 in a force-locking manner only for the case in which the selector lever 4, starting from the position of the selector lever 4 corresponding to the engaged condition P_ein of the parking lock, is rotated by a predefined angle in the direction of the position of the selector lever 4 corresponding to the disengaged condition P_aus of the parking lock. Therefore, the force of the hold-down spring 22 acting on the locking pawl 2 prevents contact between the locking pawl 2 and the parking interlock gear 1 only for the case in which this force-transmitting section of the hold-down spring 22 acts on the locking pawl 2 in a force-locking manner. Therefore, the hold-down spring 22 can be effective or acting only when the parking lock is disengaged. If the selector lever 4 rotates into the position of the selector lever 4 intended for engaging the parking lock, the hold-down spring 22 releases the locking pawl 2 and the hold-down spring 22 rotates along with the selector lever 4 and/or with the aid of the selector level 4 away from the stop point on the locking pawl 2, so that the ratchet tooth 2a of the locking pawl 2 can now drop into a tooth space 1a of the parking interlock gear 1 without the counter force of the hold-down spring 22, i.e., only with the aid of the spring force of the spring 9.

The mounting of the hold-down spring 22 on the selector lever 4 allows for a geometric embodiment of the selector lever 4 including two coupling recesses for a captive attachment of the hold-down spring 22. A further advantage of such an example embodiment is that the position of these two coupling recesses relative to each other allows for a wide range of the force of the hold-down spring 22 effectively acting on the locking pawl 2. Therefore, the working range of the hold-down spring 22 is adaptable to the particular application, within wide limits, despite a small rotation angle of the selector lever 4. This type of the preload of the hold-down spring 22 on the selector lever 4 also allows for a flat spring characteristic curve, with the advantage of a high hold-down force in combination with only slight locking pawl travel.

In the exemplary embodiment represented here, the hold-down spring 22 is designed as a bending spring, comprising two legs 22b, having been cost-effectively produced from spring wire. In this case, both legs of the hold-down spring 22 extend essentially plane-parallel to the locking pawl 2. A middle section 22c, bent at a right angle, of the hold-down spring 22 extends in parallel to the pawl pin 3 (and/or in parallel to the pawl pin longitudinal axis 3a) and connects the two legs 22b of the hold-down spring 22 to each other. On the end of the two legs 22b positioned opposite the middle section 22c, the spring 22 includes a free end 22a in each case, of which one is hung on the first of the two legs of the selector lever 4 and the other is hung on the second of the two legs of the selector lever. Therefore, the hold-down spring 22 surrounds the two legs of the selector lever 4. In this structural design, the force of the hold-down spring 22 acting on the locking pawl 2 prevents contact between the locking pawl 2 and the parking interlock gear 1 only for the case in which the middle section 22c of the hold-down spring 22 acts on the locking pawl 2 in a force-locking manner. Therefore, the middle section 22c of the hold-down spring 22 forms a stop for the locking pawl 2.

In the end, an engagement of the parking lock essentially takes place with the aid of the spring force of the spring, whereas a disengagement of the parking lock essentially takes place with the aid of the hydraulic pressure of the actuator 10, which is applied onto the first piston 11, against the spring force of the spring, provided the hydraulic and electrical supply necessary for controlling the actuator 10 are available.

As described above, the parking lock also includes an emergency release device, marked by reference character 15 and with the aid of which the parking lock can be mechanically transferred from the condition P_ein into the condition P_aus in the event of failure of the hydraulic and/or electrical control of the actuator 10. The emergency release device 15 can be mechanically brought into an operative connection with the selector lever 4 for this purpose. In the exemplary embodiment represented here, the emergency release device 15 includes an outer lever 16, which is arranged on the outside of the transmission housing 20 of the automatic transmission, and an inner lever 17, which is arranged in the interior space of the transmission housing 20 and is connected in a torsion-proof or rotationally fixed manner to the outer lever 17. The inner lever 17 includes a leg 17a, which, in the case of an actuation of the emergency release device 15, mechanically acts directly on a leg 4b of the selector lever 4, so that the selector lever 4 rotates on the axis of rotation (3a) in the direction of rotation intended for the disengagement of the parking lock.

In the first exemplary embodiment of the invention represented here, it is essential that the actuator 10 includes a bi-stable detent device 13 for the first piston 11, which is arranged within the actuator housing 14—centrally within the first piston 11, by way of example, in this case—and can be electromagnetically actuated by an electromagnet 13a, which is arranged on the actuator housing 14, in such a way that the detent device 13 mechanically blocks an axial movement of the first piston 11 either in a piston position associated with the engaged condition P_ein of the parking lock or in a piston position associated with the disengaged condition P_aus of the parking lock, when the electromagnet 13a is not energized. The electromagnet 13a must be energized in order to release the detent in the particular piston position of the first piston 11.

It is only the particular design of the actuator 10 including the two pistons 11, 12 that makes it possible, in the case of an actuation of the emergency release device 15, for the second piston 12 of the actuator 10 to be axially displaced by the selector lever 4 without the first piston 11 of the actuator 10 exiting the piston position corresponding to the engaged condition P_ein of the parking lock, which is explained in greater detail in the following with reference to functional sequences during the engagement and disengagement of the parking lock.

Starting from the condition P_ein, in which the parking lock is engaged, the example embodiment of the actuator 10 according to example aspects of the invention requires the following functional sequence during the disengagement of the parking lock during the normal operation of the automatic transmission, provided the hydraulic and electrical supply of the actuator 10 is ensured.

In the normal condition P_ein, a pressure chamber 14a, which is formed by an outer surface of the control housing 14 and an end face of the first piston 11, is vented on the control-unit side. The two pistons 11 and 12 of the actuator 10 are in respective first end positions facing the electromagnet 13a, as shown in FIG. 2, wherein the first piston 11 is mechanically fixed by the detent device 13. The electromagnet 13a of the detent device 13 is de-energized. The locking cone 6 is in the locking position, in which the locking cone 6 is clamped between the guiding plate 8 and the locking pawl 2. In order to enable the parking lock to be disengaged starting from the engagement position P_ein, the electromagnet 13a is initially energized, with the result that the detent device 13 releases the first piston 11, which the detent device 13 had previously interlocked. Approximately at the same time, the previously non-pressurized pressure chamber 14a of the actuator 10 is pressurized, with the result that the first piston 11 moves axially in the direction opposite the pressure chamber, against the spring force of the spring 9, due to the pressure acting on the first piston 11 and, in the process, carries the second piston 12 along until a predefined second end position has been reached. The axial movement of the second piston 12 is converted, via the pin 12b inserted in the piston rod 12a and the driving part 4a of the selector lever 4, into a turning motion of the selector lever 4 about its axis of rotation (3a) in the direction of rotation intended for the disengagement of the parking lock. This turning motion of the selector lever 4 is conveyed via the connecting bar 5 to the locking cone 6, so that the locking cone 6 is mechanically pulled out of the locking position of the locking cone 6, with the result that the locking pawl 2 is pivoted due to the force vectors acting on it and, in the process, the ratchet tooth 2a is pivoted out of the tooth space 1a of the locking toothing of the parking interlock gear 1. The parking lock is now in the condition P_aus; all components involved are now in the position represented in FIG. 3. In this condition, the electromagnet 13b is now de-energized again, so that the detent device 13 mechanically fixes the first piston 11 in the second end position facing away from the electromagnet 13a. This mechanical detent of the first piston 11 secures the parking lock system against an unintentional engagement of the parking lock, which would be possible, for example, in the event of a pressure level that is not sufficient for the situation or in the event of a hydraulic defect in the pressure supply to the pressure chamber 14a of the actuator 10.

Starting from the condition P_aus, in which the parking lock is disengaged, the example embodiment of the actuator 10 according to example aspects of the invention requires the following functional sequence during the engagement of the parking lock during the normal operation of the automatic transmission, provided the hydraulic and electrical supply of the actuator 10 is ensured. In the normal condition P_aus, pressure is applied to the pressure chamber 14a of the actuator 10 acting on the first piston 11. Both pistons 11, 12 of the actuator 10 are in the respective second end positions, which faces away from the electromagnet 13a, as shown in FIG. 3, wherein the first piston 11 is mechanically fixed by the detent device 13. The electromagnet 13a of the detent device 13 is de-energized. In order to enable the parking lock to be engaged starting from the engagement position P_aus, the electromagnet 13a is initially energized, with the result that the detent device 13 releases the first piston 11, which the detent device 13 had previously interlocked. Approximately at the same time, the previously pressurized pressure chamber 14a of the actuator 10 is vented on the control-unit side, with the result that the second piston 12 moves axially in the direction of the first piston 11 due to the spring force of the spring 9. This axial movement of the second piston 12 is mechanically conveyed, on the one hand, to the first piston 11 which, as a result, is pushed axially into the first end position facing the electromagnet 13a. On the other hand, the axial movement of the second piston 12 is converted, via the pin 12b inserted in the piston rod 12a and the driving part 4a of the selector lever 4, into a turning motion of the selector lever 4 about its axis of rotation (3a) in the direction of rotation intended for the engagement of the parking lock. This turning motion of the selector lever 4 is conveyed via the connecting bar 5 to the locking cone 6 and via the locking cone 6 to the locking pawl 2, with the result that, when the ratchet tooth 2a hits a tooth space 1a of the locking toothing of the parking interlock gear 1 and is not repelled by the outer diameter of the locking toothing due to a rotational speed of the parking interlock gear 1 that is too high, the ratchet tooth 2a engages into the tooth space 1a in a form-fit manner and, as a result, fixes the parking interlock gear 1. The parking lock is now in the condition P_ein; all components involved are now once again in the position represented in FIG. 2. In this condition P_ein, the electromagnet 13b is now de-energized again, and so the detent device 13 mechanically fixes the first piston 11 in the end position facing the electromagnet 13a.

A failure of the actuation of the actuator 10 in the condition P_aus, in which the parking lock is disengaged, does not pose a problem, since the parking lock cannot independently change the engagement position of the parking lock due to the still-engaged mechanical interlock of the first piston 11, and the automatic transmission therefore remains, unchanged, in the engagement position P_aus known to the driver and the motor vehicle can be moved with the automatic transmission unchanged.

In the event of a failure of the actuation of the actuator 10 in the condition P_ein, in which the parking lock is engaged, the emergency release device 15 is available to the driver of the motor vehicle in which the automatic transmission including the parking lock according to example aspects of the invention is installed, in order to enable the parking lock to be disengaged even without the actuator 10. In the normal condition P_ein, the components involved are in the respective positions as shown in FIG. 2. An actuation of the emergency release device 15 initiates a pivoting of the levers 16 and 17 of the emergency release device 15, which are connected to each other in a torsion-proof manner. During this pivoting, the leg 17a of the inner lever 17 presses against the leg 4b of the selector lever, with the result that the selector lever 4 rotates about the axis of rotation (3a) in the direction of rotation intended for the disengagement of the parking lock and, in the process, as in the case during normal operation, pulls the locking cone 6 out of the locking position with the aid of the connecting bar 5 and thereby disengages the parking lock. Due to the fact that the selector lever 4 is also mechanically connected, via the driving part 4a and the pin 12b, to the piston rod 12a of the second piston 12 of the actuator 10, the actuation of the emergency release device 15 also brings about an axial displacement of the second piston 12 up to the second end position. The first piston 11 of the actuator 10, on the other hand, remains in the first end position, mechanically interlocked against axial movement. The parking lock is now in the condition P_aus_not, in which the parking lock is "emergency-released" via actuation of the emergency release device 15; all components involved are in the position represented in FIG. 4.

If the actuation of the emergency release device 15 is now ceased, the two levers 16 and 17 of the emergency release device 15, which are connected to each other in a torsion-proof manner, pivot back into their normal position, due to the restoring force of a leg spring 19 provided here by way of example, with the result that the spring force of the spring 9 now initiates the engagement of the parking lock.

A "regular" pivoting of the selector lever 4 during normal operation of the transmission—i.e., with a fully operable actuator 10—has no mechanical effect whatsoever on the inner lever 17 and the outer lever 16 of the emergency release device 15.

An exemplary mounting concept of the emergency release device 15 will be described in greater detail in the following and with reference to FIG. 5. The emergency release device 15 is provided in the first exemplary embodiment of a parking lock according to example aspects of the invention. FIG. 5 shows a diagrammatic partial section in the area of the transmission housing 20, in which the outer lever 16 and the inner lever 17 of the emergency release device 15 according to FIGS. 1 through 4 are arranged. It is readily apparent that the outer lever 16 and the inner lever 17 are connected to each other in a torsion-proof manner via a pin 18, which extends through the housing wall of the transmission housing 20, wherein the interior space of the transmission housing 20, in which the parking interlock gear 1, the locking pawl 2, the selector lever 4, the actuator 10, and the inner lever 17 are arranged, is located to the right of the housing wall, as viewed in FIG. 5. Correspondingly, the exterior space including the outer lever 16 is located to the left of the housing wall, as viewed in FIG. 5. The corresponding housing bore is marked by 20a. This passage point of the transmission housing 20 is sealed off by a sealing ring 21, which concentrically surrounds the pin 18.

In order to axially secure the pin 18 in the housing bore 20a, a securing ring 18a is provided, by way of example, which engages into a corresponding external groove of the pin 18 as well as into a corresponding internal groove of the housing bore 20a and, for this purpose, is designed, for example, in the manner of a snap ring. In order to attach the outer lever 16 to the pin 18, a force-locking connection is provided, by way of example, specifically a press-fit connection, by way of example, in this case. For the attachment of the inner lever 17 to the pin 18, a form-locking connection is provided, by way of example, on a flattening 18b of the pin 18, which is axially secured via a bolt 18c with the aid of a washer 18d. In order to adjust the inner lever 17 and the outer lever 16 in a defined normal position in which the emergency release 15 has no effect on the position of the selector lever 4, the leg spring 19 of the emergency release device 15 is mounted between the inner lever 17 and the transmission housing 20 in a way suitable for this purpose, so that the leg spring 19—as mentioned above—also performs the return of the inner lever 17 and the outer lever 16 into this normal position after an actuation of the emergency release device 15.

Figure 6:
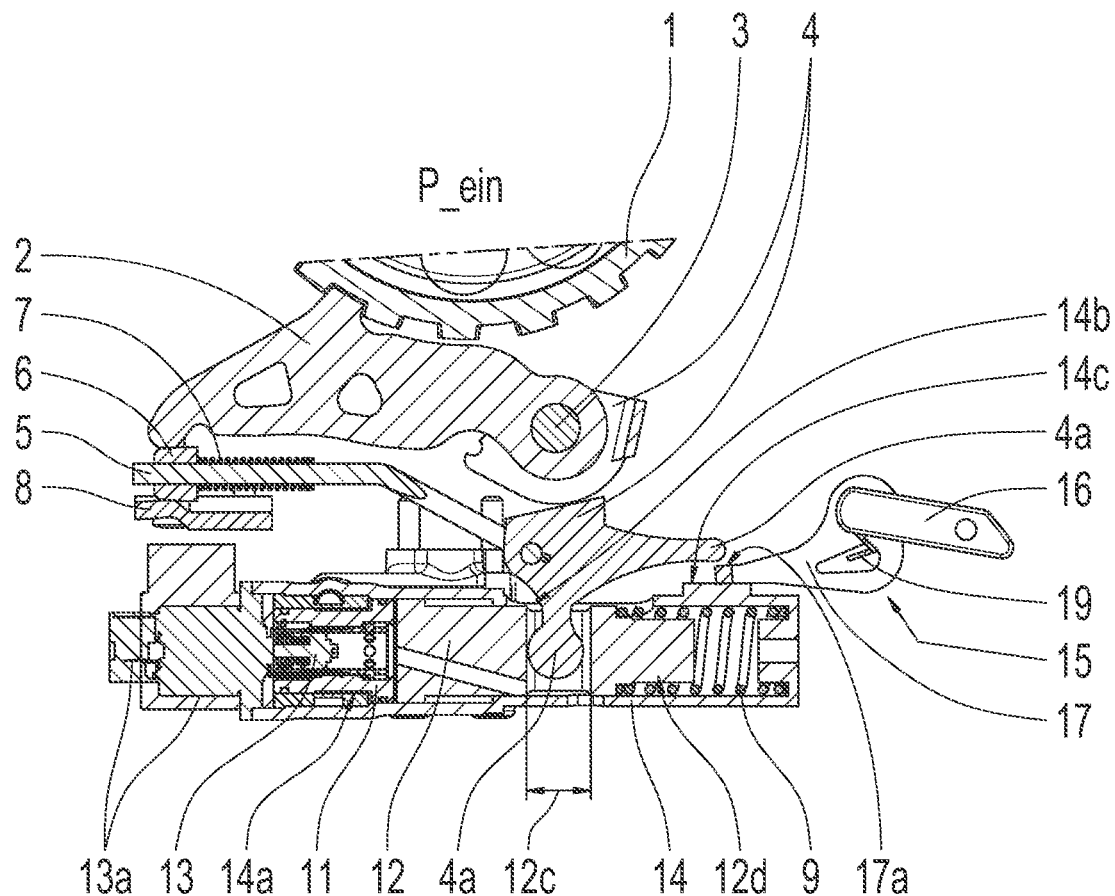
FIG. 6 shows a diagrammatic sectioning of a second exemplary embodiment of a parking lock according to example aspects of the invention in the "parking lock engaged" engagement position.

A second exemplary embodiment of a parking lock according to example aspects of the invention is described in greater detail in the following and with reference to FIG. 6. The diagrammatic sectioning of FIG. 6 shows the parking lock in the engagement position P_ein, in which the locking pawl 2 blocks the parking interlock gear 1 against rotation. In a comparison of FIG. 6 with FIG. 2, it is readily apparent that the parking lock shown in FIG. 6 differs from the parking lock shown in FIG. 2 only with respect to the structural design of the second piston 12 of the actuator 10. Therefore, the following description of FIG. 6 can be limited to this difference in order to avoid repetitions.

In the second exemplary embodiment of a parking lock according to example aspects of the invention shown in FIG. 6, the second piston 12 of the actuator 10 includes a recess 12c, into which the driving part 4a of the selector lever 4 engages. In order to allow for this engagement, the control housing 14 includes a sufficiently large recess 14b, through which the driving part 4a extends in the radial direction. The geometry of the external contour of the driving part 4a acting on the second piston 12 defines the speed progression of the turning motion of the selector lever about the axis of rotation (3a) during an axial movement of the second piston 12, the movement progression of which is predefined by the pressure reduction in the pressure chamber 14a. On the end facing away from the first piston 11, the second piston 12 includes a centering shoulder 12d, which is utilized for centering the spring 9 and, therefore, is concentrically surrounded by the spring 9.

As a further structural detail, it is provided in FIG. 6 that a stop surface 14c is provided on the outside of the actuator housing 14, against which the leg 17a of the inner lever 17 of the emergency release device 15 can rest when the emergency release device 15 is not actuated. This allows for a structurally simplified of the control housing.

Figure 7:
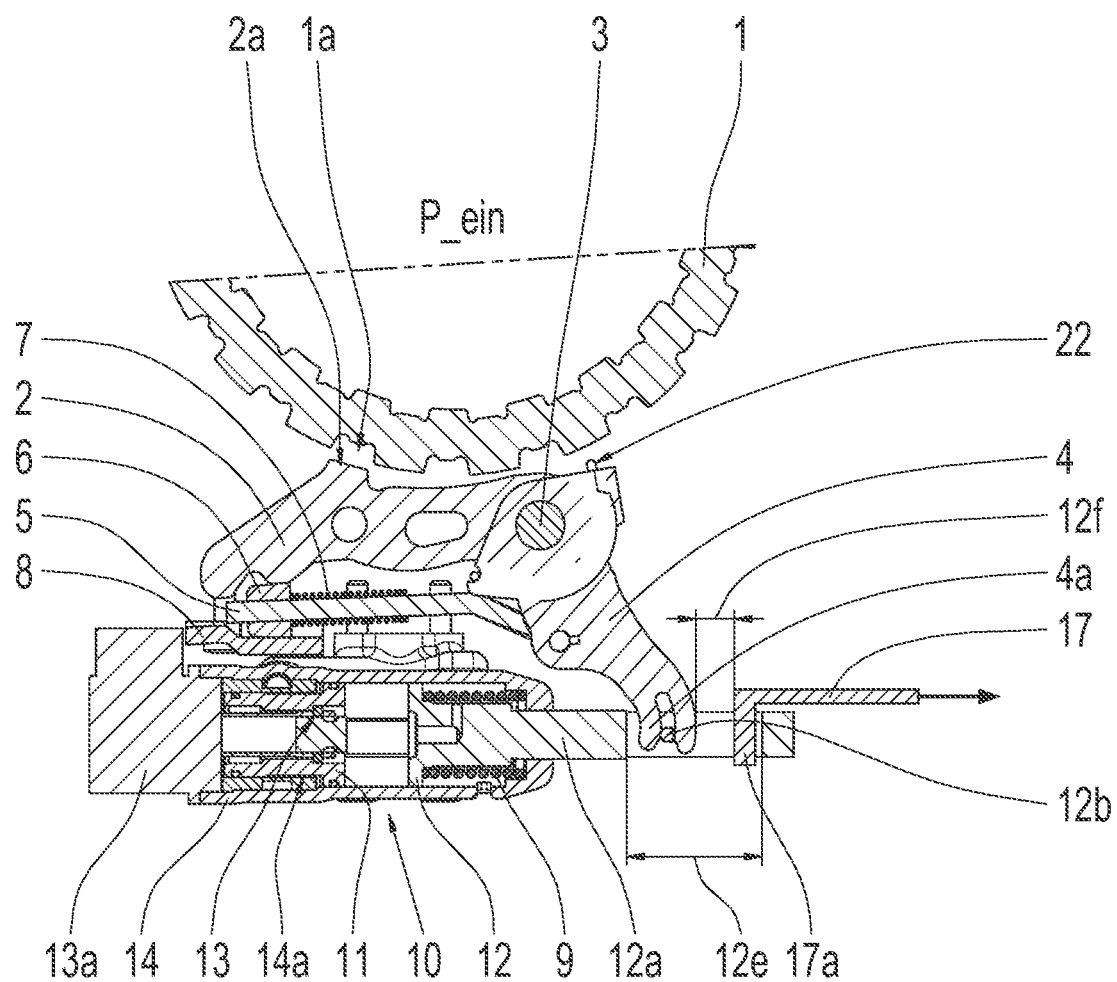
FIG. 7 shows a diagrammatic sectioning of a second exemplary embodiment of a parking lock according to example aspects of the invention in the "parking lock engaged" engagement position.

A third exemplary embodiment of a parking lock according to example aspects of the invention is described in greater detail in the following and with reference to FIG. 7. The diagrammatic sectioning of FIG. 7 shows the parking lock in the engagement position P_ein, in which the locking pawl 2 blocks the parking interlock gear 1 against rotation. In a comparison of FIG. 7 with FIG. 2, it is readily apparent that the parking lock shown in FIG. 7 differs from the parking lock shown in FIG. 2 only with respect to how the selector lever 4 can be actuated by the inner lever 17 of the emergency release device 15 for the emergency release of the parking lock. Therefore, the following description of FIG. 7 can be limited to this difference in order to avoid repetitions.

In the third exemplary embodiment of a parking lock according to example aspects of the invention shown in FIG. 7, the leg 17a of the inner lever 17 of the emergency release device 15 can be brought into an operative connection with the selector lever 4 via the piston rod 12a of the second piston 12 of the actuator 10 provided for actuating the selector lever 10. For this purpose, the piston rod 12a includes a specific engagement section 12e, on which, on the side facing the first piston 11, the pin 12b is inserted, via which the axial movement of the second piston 12 is transmitted to the driving part 4a of the selector lever 4. The side of the engagement section 12e facing away from the first piston 11 is designed in such a way that the leg 17a of the inner lever 17 plunges into the engagement section 12e and, during the actuation of the emergency release device 15, exerts a pulling force F onto the piston rod 12a directed counter to the spring force of the spring. In FIG. 7, the inner lever 17 is in the normal position in which the emergency release device 15 is not actuated. In order to ensure that the emergency release device 15 does not affect the axial movement of the second piston 12 during normal operation, a defined open space 12f is provided axially between the driving part 4a of the selector lever 4 and the leg 17a of the inner lever 17.

Figure 8A:
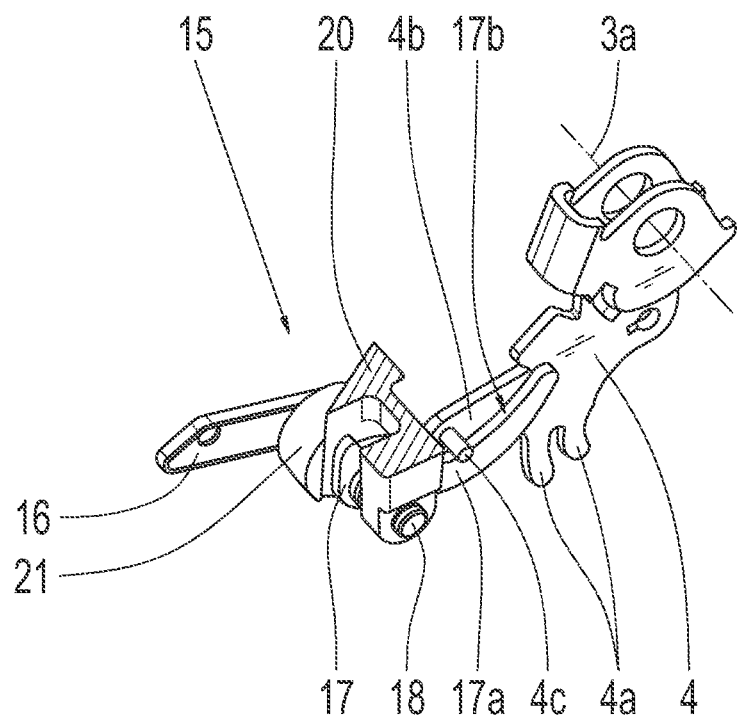
FIG. 8A shows a perspective representation of an example alternative emergency release device.
Figure 8B:
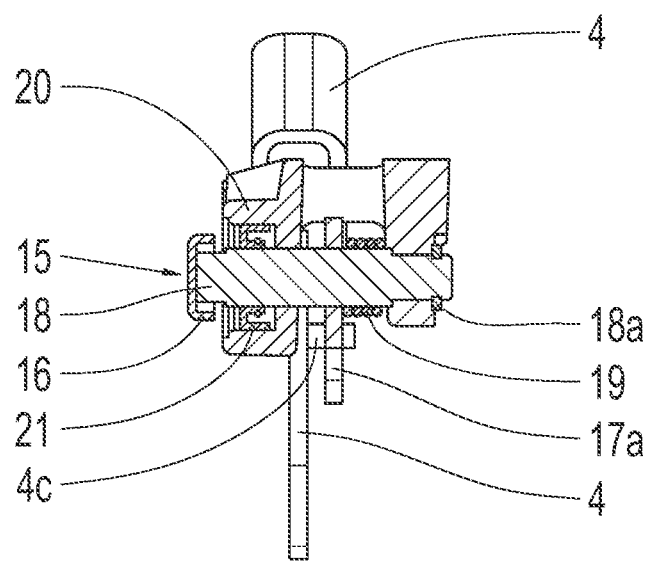
FIG. 8B shows a sectioning of the example emergency release device according to FIG. 8A.
Figure 8C:
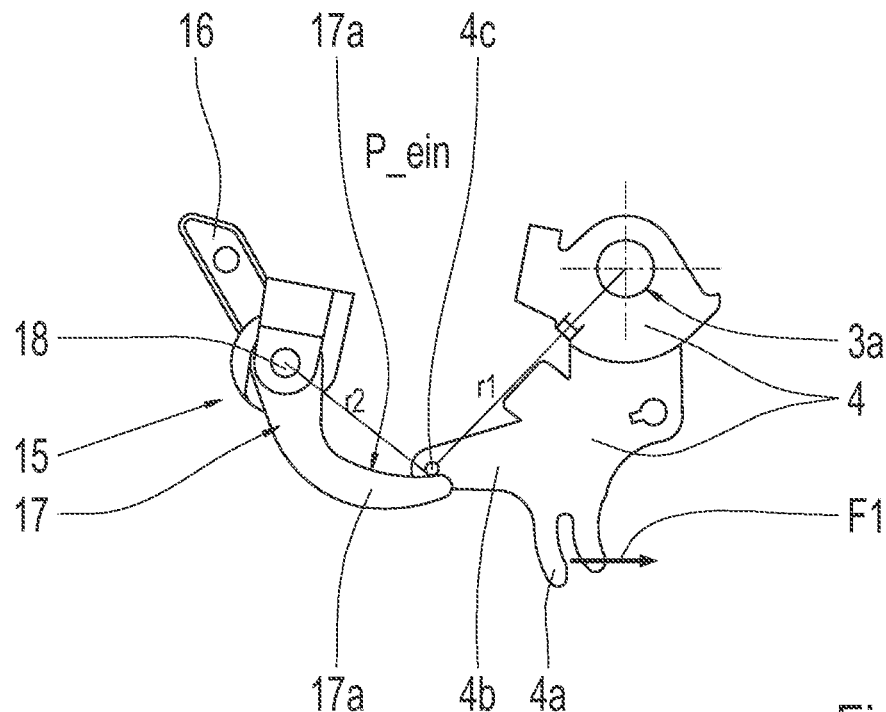
FIG. 8C shows a side view of the example emergency release device according to FIG. 8A in the "parking lock engaged" engagement position.
Figure 8D:
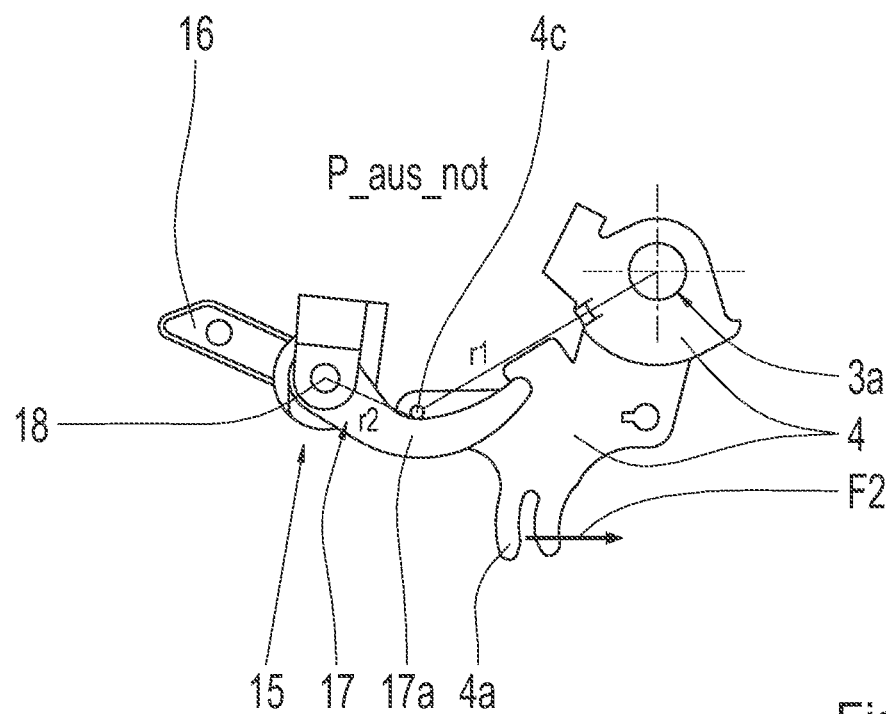
FIG. 8D shows a side view of the example emergency release device according to FIG. 8A in the "parking lock emergency-released" engagement position.

An alternative exemplary embodiment of an emergency release device for a parking lock according to example aspects of the invention is described in greater detail in the following and with reference to FIGS. 8A through 8D. FIG. 8A shows this alternative emergency release device in a perspective representation, and FIG. 8B shows this in a section view. FIG. 8C shows a side view of this alternative emergency release device in the "parking lock engaged" engagement position at the beginning of the manually initiated parking lock emergency release. Finally, FIG. 8D shows a side view of this alternative emergency release device in the "parking lock emergency-released" engagement position, i.e., for the case in which the parking lock has been disengaged via manual actuation of the emergency release.

As is readily apparent from FIGS. 8A and 8B, a pin 4c is arranged laterally on the leg 4b of the selector lever 4 cooperating with the emergency release device 15, is fixedly connected to the leg 4b, and extends axially parallel to the selector-lever axis of rotation 3a. The inner lever 17 of the emergency release device 15 has, on the top side of the leg 17a, a curved contour 17b, which, during the actuation of the emergency release device 17, acts on the pin 4c in a force-locking manner in such a way that the pin 4c slides along this contour 17b during the manually initiated rotation of the selector lever 4 about the selector-lever axis of rotation 3a, which is illustrated in FIGS. 8C and 8D. The force ratios arising during the emergency release of the parking lock result, in this case, from the lever arm ratio r1/r2, in which the lever arm r1 is defined as the center distance between the selector-lever axis of rotation 3a and the longitudinal axis of the pin 4c, and the lever arm r2 is defined as the center distance between the selector-lever axis of rotation 3a and the longitudinal axis of the pin 18 of the emergency release device 15. Logically, the lever arm r1 is constant, whereas the lever arm r2 decreases during the actuation of the emergency release device 15 starting from the engagement position P_ein in the temporal progression of the selector lever turning motion, up to the point at which the engagement position P_aus_not has been reached.

The advantageous effect of this structural design is that, given a constant actuation force of the inner lever 17, the force actually transmitted onto the connecting bar 5 increases in the course of the parking lock emergency release process and, therefore, compensates for the increase of the counter force—which occurs in the course of each parking lock disengagement process and necessarily results due to the compression of the spring 9—acting on the connecting bar 5 in the parking lock engagement direction, during the parking lock disengagement process. This is illustrated in FIGS. 8C and 8D via the actuation forces F1 (at the beginning of the parking lock emergency release) and F2 (at the end of the parking lock emergency release) transmitted onto the second piston (12) of the parking lock actuator (10).

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 parking interlock gear
1a tooth space of the locking toothing of the parking interlock gear
2 locking pawl
2a ratchet tooth of the locking pawl
3 pawl pin
3a pawl pin longitudinal axis; locking pawl pivot axis; selector-lever axis of rotation
4 selector lever
4a driving part of the selector lever
4b leg of the selector lever
4c pin
5 connecting bar
6 interlocking element; locking cone
7 spring element
8 guiding plate
9 spring, compression spring
10 actuator
11 first piston of the actuator
12 second piston of the actuator
12a piston rod of the second piston
12b pin
12c recess in the second piston
12d centering section of the second piston
12e engagement section of the piston rod of the second piston
12f open space of the piston rod of the second piston
13 detent device
13a electromagnet of the detent device
14 control housing of the actuator
14a pressure chamber in the control housing
14b recess in the control housing
14c stop surface of the control housing
15 emergency release device
16 outer lever of the emergency release device
17 inner lever of the emergency release device
17a leg of the inner lever
17b curved contour of the inner lever
18 pin of the emergency release device
18a securing ring of the pin
18b flattening of the pin
18c bolt of the pin
18d washer
19 leg spring of the emergency release device
20 transmission housing
20a housing bore
21 sealing ring
22 hold-down spring
22a free end of the hold-down spring
22b leg of the hold-down spring
22c middle section of the hold-down spring
P_aus disengaged condition of the parking lock
P_aus_not disengaged condition of the parking lock after actuation of the emergency release device
P_ein engaged condition of the parking lock
F pulling force during the emergency release of the parking lock
F1 actuation force at the beginning of the emergency release of the parking lock
F2 actuation force at the end of the emergency release of the parking lock

The invention claimed is:
1. A parking lock for an automatic transmission in a motor vehicle, comprising:
a parking interlock gear (1) having a locking toothing with tooth spaces (1 a), the parking interlock gear (1) connectable to a transmission shaft in a rotationally fixed manner;
a locking pawl (2) pivotably mounted on a pawl pin (3), the locking pawl (2) having a ratchet tooth (2a), the ratchet tooth (2a) engaging into one of the tooth spaces (1 a) of the locking toothing of the parking interlock gear (1) in an engaged condition (P_ein) of the parking lock to block rotation of the parking interlock gear (1) and the transmission shaft;
a selector lever (4) rotatable about a selector-lever axis of rotation (3a) to specify an engagement position (P_ein, P_aus) of the parking lock;
a connecting bar (5) having an interlocking element (6) spring-mounted counter to a parking lock disengagement direction, the interlocking element (6) configured to engage the ratchet tooth (2a) of the locking pawl (2) into the one of the tooth spaces (1 a) of the locking toothing of the parking interlock gear (1) during engagement of the parking lock, the interlocking element (6) configured to prevent the ratchet tooth (2a) of the locking pawl (2) from being pushed out of the one of the tooth spaces (1 a) of the locking toothing of the parking interlock gear (1) in the engaged condition (P_ein) of the parking lock, an end of the connecting bar (5) spaced from the interlocking element (6) articulatedly connected to the selector lever (4);
a spring (9) having a spring force that acts on the selector lever (4) in a parking lock engagement direction;
a hydraulically actuatable actuator (10) configured to apply a compressive force on the selector lever (4) in the parking lock disengagement direction; and
an emergency release device (15) mechanically connectable with the selector lever (4) such that the parking lock is manually disengageable with the emergency release device (15),
wherein the hydraulically actuatable actuator (10) comprises two pistons (11, 12) and a detent device (13), the two pistons (11, 12) are axially displaceably arranged on a longitudinal axis in an actuator housing (10), and the detent device (13) is arranged in the actuator housing (14) and is actuatable by an electromagnet (13a),
wherein a first piston (11) of the two pistons (11, 12) is hydraulically pressurizable in order to disengage the parking lock and, upon pressurization, axially displace a second piston (12) of the two pistons (11, 12) against the spring force of the spring (9), wherein the second piston (12) is mechanically connected to the selector lever (4) such that an axial movement of the second piston (12) rotates the selector lever (4) about the selector-lever axis of rotation (3a) and rotation of the selector lever (4) about the selector-lever axis of rotation (3a) axially moves the second piston (12), wherein the detent device (13) mechanically fixes the first piston (11) either in a piston position associated with the engaged condition (P_ein) of the parking lock or in a piston position associated with the disengaged condition (P_aus) of the parking lock when the electromagnet (13a) acting on the detent device (13) is not electrically energized, wherein the electromagnet (13a) releases the detent device (13) when the electromagnet (13a) is energized, and wherein the second piston (12) is axially displaceable by the selector lever (4) without the first piston (11) leaving the piston position corresponding to the engaged condition (P_ein) of the parking lock during actuation of the emergency release device (15).

2. The parking lock of claim 1, wherein the first piston (11) and the second piston (12) are arranged one behind the other along the longitudinal axis.

3. The parking lock of claim 1, wherein the spring (9) is a compression spring axially mounted between the second piston (12) and the actuator housing (14), and the compression spring entirely or partially concentrically surrounds a piston rod (12a) of the second piston (12).

4. The parking lock of claim 1, wherein further comprising a transmission housing-affixable guiding device, the guiding device being a guiding plate (8) or a guide sleeve, the interlocking element (6) resting against the guiding device counter to the locking pawl (2) during the engagement and disengagement of the parking lock.

5. The parking lock of claim 4, wherein the guiding device is attached to the actuator housing (14).

6. The parking lock of claim 4, wherein the guiding device is formed integrally with the actuator housing (14).

7. The parking lock of claim 1, wherein, upon actuation of the emergency release device (15), an inner lever (17) of the emergency release device (15) mechanically acts directly on the selector lever (4), the inner lever (17) arranged within a transmission housing (20) of the automatic transmission.

8. The parking lock of claim 1, wherein, upon actuation of the emergency release device (15), an inner lever (17) of the emergency release device (15) mechanically acts directly on a piston rod (12a) of the second piston (12) such that the inner lever (17) acts on the selector lever (4) via the piston rod (12a), the inner lever (17) arrangeable within a transmission housing (20) of the automatic transmission.

9. The parking lock of claim 1, wherein the selector lever (4) is displaceably mounted on the pawl pin (3) such that a pawl pin longitudinal axis, a locking pawl pivot axis, and the selector-lever axis of rotation (3a) are coaxial.

10. The parking lock of claim 1, wherein the connecting bar (5) is arranged below the locking pawl (2) such that a plane of movement of the connecting bar (5) is arranged essentially in parallel to a plane of movement of the locking pawl (2), the selector lever (4), and a piston rod (12a).

11. The parking lock of claim 1, wherein the selector lever (4) comprises two legs, each of the two legs comprising a circular bore for mounting the selector lever (4) on the pawl pin (3), the circular bores of the two legs arranged coaxially, the locking pawl (2) mounted between the two legs.

12. The parking lock of claim 1, further comprising a hold-down spring (22) attached to or hung on the selector lever (4), the hold-down spring (22) preventing the locking pawl (2) from touching the parking interlock gear (1) in the disengaged condition (P_aus) of the parking lock.

13. The parking lock of claim 12, wherein a force-transmitting section (22a, 22c) of the hold-down spring (22) contacts the locking pawl (2) in a force-locking manner only when the selector lever (4), starting from a position of the selector lever (4) in the engaged condition (P_ein) of the parking lock, rotates by a predefined angle in a direction of a position of the selector lever (4) in the disengaged condition (P_aus) of the parking lock such that a force of the hold-down spring (22) acting on the locking pawl (2) prevents contact between the locking pawl (2) and the parking interlock gear (1) only when the force-transmitting section (22a, 22c) of the hold-down spring (22) acts on the locking pawl (2) in a force-locking manner.

14. The parking lock of claim 12, wherein the hold-down spring (22) is preloaded on the selector lever (4) such that a force-transmitting section (22a, 22c) of the hold-down spring contacts the locking pawl (2) in a force-locking manner when the selector lever (4) is in a position of the selector lever (4) corresponding to the engaged condition (P_ein) of the parking lock, and, when the selector lever (4) starting from the position of the selector lever (4) corresponding to the engaged condition (P_ein) of the parking lock, rotates in a direction of a position of the selector lever (4) corresponding to the disengaged condition (P_aus) of the parking lock, a force of the hold-down spring (22) acting on the locking pawl (2) increases to prevent contact between the locking pawl (2) and the parking interlock gear (1).

15. The parking lock of claim 1, wherein the detent device (13) is configured to selectively mechanically fix the first piston (11) relative to actuator housing (10).

* * * * *